United States Patent [19]

Maeshiba

[11] 4,418,340
[45] Nov. 29, 1983

[54] LIQUID LEVEL INDICATOR IN A CYLINDRICAL GASOLINE TANK OF THE HORIZONTAL TYPE

[76] Inventor: Sozaburo Maeshiba, 1-33 2 chome, Tani, Chuo-ku, Fukuoka, Japan

[21] Appl. No.: 252,789

[22] Filed: Apr. 10, 1981

[51] Int. Cl.³ .............................................. G08B 21/00
[52] U.S. Cl. ................................... 340/618; 340/620; 340/623
[58] Field of Search .............. 340/618, 619, 620, 623, 340/624; 73/308, 314; 137/392; 364/564

[56] References Cited

U.S. PATENT DOCUMENTS 2,388,559  11/1945  MacIntyre ........................ 364/564
4,229,798  10/1980  Rosie et al. ........................ 364/564
4,231,025  10/1980  Turner, Jr. ........................ 340/620

Primary Examiner—Gerald L. Brigance
Attorney, Agent, or Firm—Brisebois & Kruger

[57] ABSTRACT

In case where a cylindrical gasoline tank embedded in the underground of a gasoline station is of the horizontal type, a liquid level sensor for sensing the liquid level of the gasoline is disposed in the tank, the liquid level in the tank as sensed by the sensor is converted into an electric signal, the electric signal is converted into a signal expressive of the quantity of the gasoline received in the tank by utilizing a segmental function, and this signal is used to indicate the received quantity of the gasoline with electric-light numerals.

3 Claims, 3 Drawing Figures ary nonlinear circuit. Numeral 15 represents a nonlinear conversion circuit, and numeral 16 an indicating counter.

LIQUID LEVEL INDICATOR IN A CYLINDRICAL GASOLINE TANK OF THE HORIZONTAL TYPE

BACKGROUND OF THE INVENTION

Regarding the indication of the quantity of gasoline in a gasoline tank buried in the underground of a gasoline station, various indicating methods have been considered depending upon the shapes of the tanks.

For example, in case where the tank is in the shape of a rectangular parallelepiped, the quantity of gasoline can be readily known by sensing the liquid level of the gasoline in the tank. The same applies to a cylindrical tank of the vertical type.

In case of a cylindrical gasoline tank of the horizontal type, however, the quantity of gasoline received in the tank cannot be readily known even when the liquid level of the gasoline has been known. Only one method has been to calculate the quantity of the received gasoline with a segmental function table.

SUMMARY OF THE INVENTION

This invention has been made in view of the drawback stated above, and has for its object to provide a liquid level indicator in a cylindrical gasoline tank of the horizontal type.

In order to accomplish the object, according to this invention, the liquid level of gasoline in a cylindrical gasoline tank of the horizontal type is sensed and converted into an electric signal, the electric signal is further converted into an electric signal expressive of the quantity of the gasoline by utilizing a segmental function, and this signal is used to indicate the quantity of the gasoline with electric-light numerals, whereby the quantity of the gasoline received in the tank can be digitally grasped.

DETAILED DESCRIPTION OF THE INVENTION

The subject matter of this invention consists in that the quantity of gasoline in a gasoline tank of the horizontal type is expressed with electric-light numerals by utilizing a segmental function.

While an embodiment of this invention will be described below, it is also possible to indicate the quantity of gasoline received in a gasoline tank of the horizontal type by storing the segmental function in advance by the use of a micro-computer.

Figure 1:
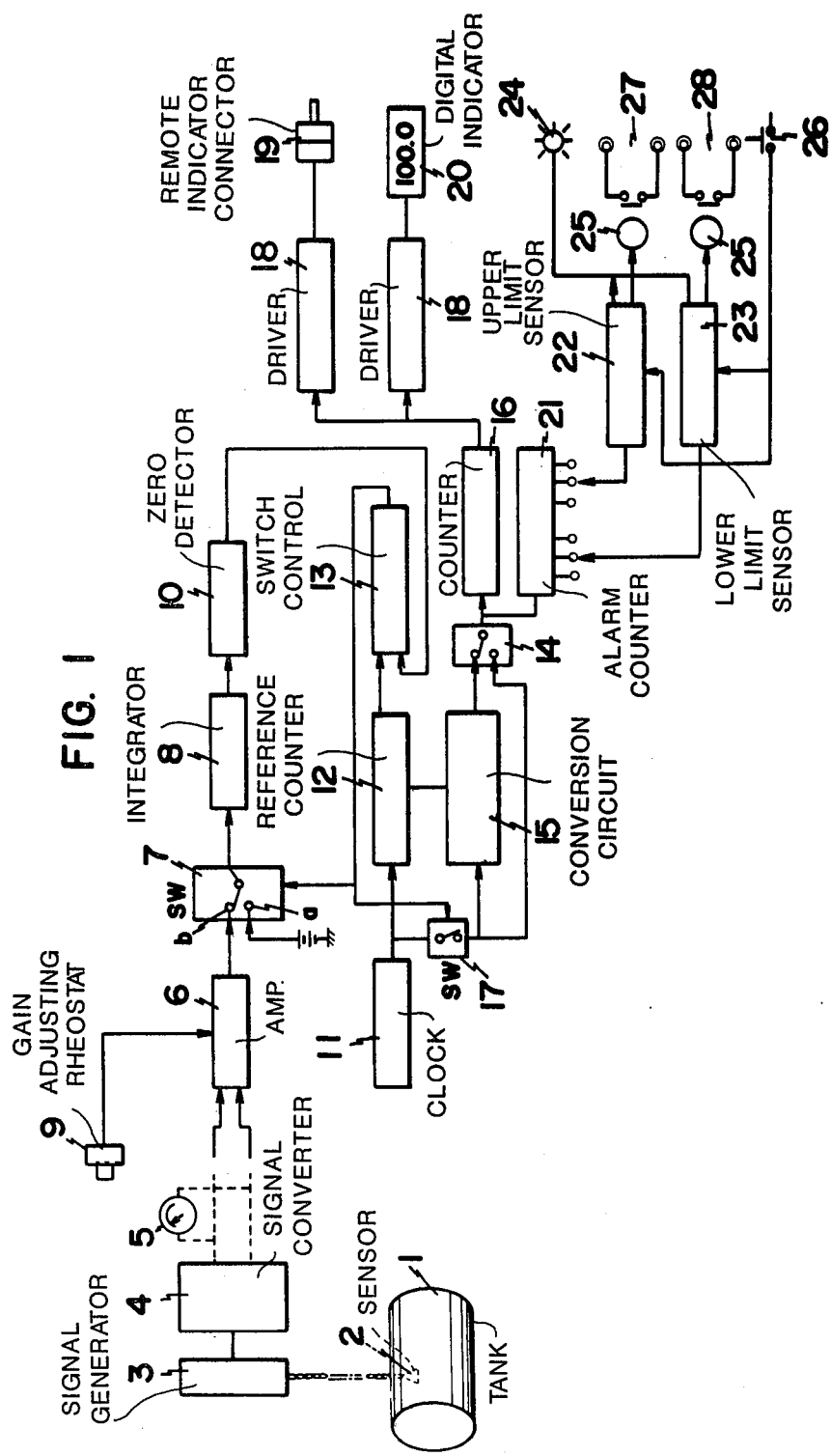
FIG. 1 shows a circuit block diagram of this invention.

FIG. 1 shows a circuit block diagram. Referring to the figure, numeral 1 designates a cylindrical gasoline tank of the horizontal type, in which a liquid level sensor 2 is installed. Numeral 3 designates a signal generating portion which is disposed in association with the liquid level sensor 2, and which generates an electric signal in response to a liquid level change sensed by the sensor 2. Numeral 4 designates a voltage signal converting portion, and numeral 5 an ammeter which is used for the ordinary liquid-level indication. Shown at numeral 6 is an input amplifier, which amplifies an input signal approximately 5 times and applies the amplified signal to an integrator 8 through a switch 7.

Numeral 9 denotes a full-scale adjusting variable resistor, which varies the gain of the amplifier 6.

Numeral 10 indicates a zero detector, numeral 11 a clock signal generator, numeral 12 a reference counter, and numeral 13 a switch control circuit.

In case of a cubical gasoline tank, linear changes are necessary. In this regard, a switch 14 serves to avoid any nonlinear circuit. Numeral 15 represents a nonlinear conversion circuit, and numeral 16 an indicating counter.

Here will be described the operation of the circuit arrangement in which the input from the liquid level sensor 2 is converted into direct current and then subjected to a nonlinear conversion. The liquid level in the cylindrical gasoline tank 1 is sensed by the liquid level sensor 2, and the electric signal corresponding thereto is generated by the signal generating portion 3. The input amplifier 6 has the input signal applied to its input terminal, and amplifies it approximately 5 times. The amplified signal is applied to the integrator 8 through the switch 7.

The unknown voltage $V_x$ provided from the amplifier 6 is applied through the switch 7 to the integrator 8, in which it is integrated or charged for a predetermined time $T_1$. Subsequently, the switch 7 is changed-over by a signal of the switch control circuit 13. Under this state, a reference voltage $V_s$ opposite in polarity to the initial input voltage is applied to the integrator 8, in which it is integrated in the inverse direction or discharged. The completion of the discharge is detected by the zero detector 10. Letting $T_2$ denote the period of the inverse integral, the following expression holds among the integral periods $T_1$ and $T_2$ and the voltages $V_x$ and $V_s$:

$$T_1/T_2 = V_s/V_x$$

Accordingly, $V_x$ can be evaluated if $T_1$, $T_2$ and $V_s$ are known.

The circuit arrangement is set in advance so that, when 1 V (1,000 mV) is applied as the input, the indication may become 1,000 counts = 100.0% owing to the reference voltage. The count value of 1,000 counts (= 100.0% indication) corresponds to the voltage $V_s$. Let it be supposed by way of example that when the charging is made with the voltage $V_x$ for the period of 1,000 counts and is followed by the inverse charging (discharging) with the reference voltage $V_s$, the discharging ends (zero is sensed) at 500 counts. Then, $T_1 = 1,000$ counts, $T_2 = 500$ counts, and $V_s = 100.0\%$ indication. In accordance with the aforecited expression, $V_x = (500/1,000) \times 100\% = 100\%/2 = 50\%$ indication is obtained.

Since the charging period T of the input voltage is determined by such series of operations, a signal provided when the reference counter 12 has counted 1,000 pulses from the clock oscillator 11 enters the switch control circuit 13 so as to change-over the switch 7 from a position b to a position a.

When a zero detection signal based on the end of the inverse charging is applied to the switch control circuit 13, the switch 7 is reset from a to b, and the same operations are repeated again.

Figure 2:
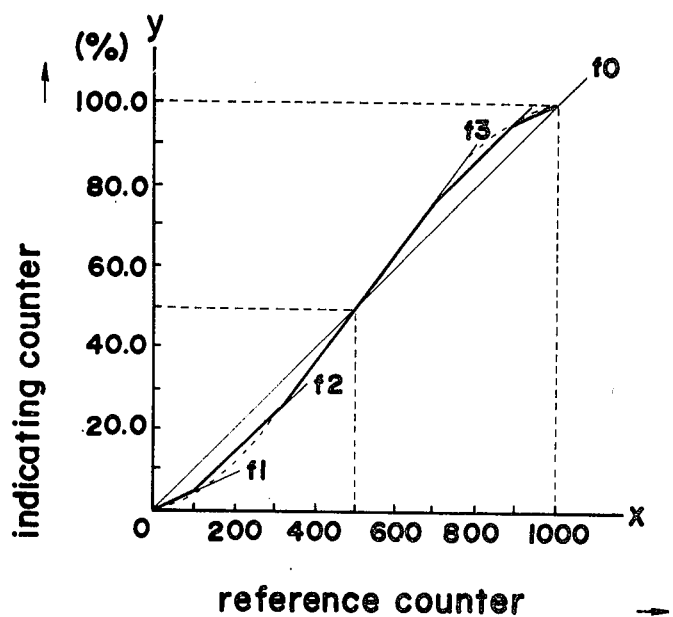
FIG. 2 shows a graph illustrative of the relationship between a segmental function and polygonal lines.

In this manner, the analog-to-digital conversion is executed. In order to obtain approximate polygonal lines along the curve of a segmental function, the nonlinear conversion circuit 15 varies the proportion of the number of input pulses to the indicating counter 16 in dependence on the content of the reference counter. Symbol $f_o$ in FIG. 2 represents the content of the reference counter, and symbols $f_1$-$f_3$ represent the approximate polygonal lines obtained along the curve of the segmental function by varying the proportion of the number of the input pulses. For example, when the content of the reference counter 12 is 0–100, the indicating counter 16 is given pulses of 5.2% of the number of the input pulses to the reference counter 12, whereby the line approximate to the curve of the segmental function is obtained.

Since the numerical value required for the indication is the number of pulses during the inverse charging period $T_2$ based on the reference voltage, control is made through a switch 17 so as to count the input of the indicating counter 16 during only the period $T_2$.

The output of the indicating counter 16 is provided every digit by the time division system, and is applied to a numeral indicator-driving circuit 18. The numeral indicator-driving circuit 18 is provided with two circuits, one of which is externally led by a connector 19 so as to drive an indicator of a separate indication box. Shown at numeral 20 is a digital indicator.

In relation to the capacity of a power supply, the circuit arrangement is so constructed that when the external indication connector is connected, all the internal indicators are put out.

An alarm counter 21 receives the same number of input pulses as those of the indicating counter 16. When an upper-limit or lower-limit value has been sensed, an alarm lamp 24 is lit up by an upper-limit sensor circuit 22 or a lower-limit sensor circuit 23. In addition, an upper-limit alarm contact 27 or a lower-limit alarm contact 28 is actuated through a relay 25.

Numeral 26 designates an alarm releasing button.

As set forth above, the subject matter of this invention is that, by utilizing the segmental function, the linear variation of the analog input is made nonlinear for the digital indication. The principle for making the linear variation nonlinear is that the frequency of the counting pulses to the indicating counter 16 is varied in accordance with the cumulative count number of the reference counter 12 which linearly counts the clock pulses generated by the clock oscillator 11, thereby to vary the counting proportion of the indicating counter 16. In this invention, as indicated in the embodiment, the single clock oscillator is prepared, and it is equivalently made frequency-variable by the use of a presetable divide-by-N counter whose scale of notation can be changed by an external preset input.

Herein, the inclination of a straight line falling within an allowance in specification is evaluated on the basis of the curve of the segmental function. In this invention, the variable frequency has been divided into the three stages $f_1$ to $f_3$. (refer to FIG. 2)

In this case, the preset input is given so that, when the inclination of the graph of FIG. 2 is 1 (one) or $y=x$, the presetable counter may operate as a decimal counter.

When the reference counter is at 0–100 counts (liquid level is at 0–100 mm), the capacity becomes 5.2% at 100 mm in view of a segmental area table, and hence, the inclination becomes 5.2/100.

Accordingly, the pulses have a period of 5.2/100, that is, the frequency becomes $f_1=100/5.2\approx 19$. Therefore, the presetable counter is made a nonadecimal counter. Similarly, it is made a decimal counter at $f_2=100/100=1$, and it is made an octal counter at $f_3=400/496\approx 0.8$.

Figure 3:
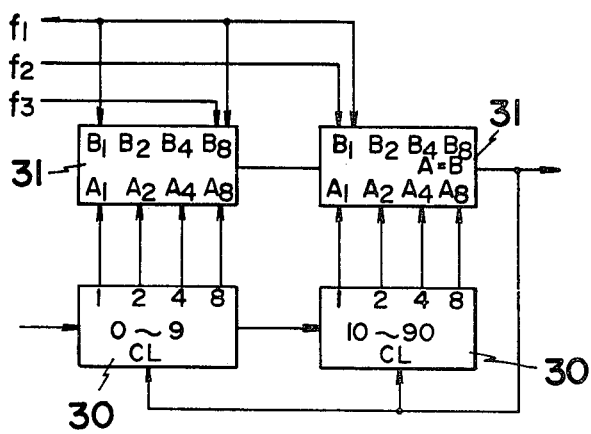
FIG. 3 shows a circuit diagram of a divide-by-N counter circuit.

The divide-by-N counter circuit is constructed by employing two BCD counters 30 and two 4-bit digital comparators 31 as its principal constituents. (refer to FIG. 3)

In this circuit, the preset input is given as $f_1=19$ in advance. When the count value of the BCD counters has become 19, A=B of the comparators is provided as an output. This signal is used as the count input pulse of the indicating counter 16, and simultaneously used to reset the BCD counters 30. Thus, one pulse is provided in correspondence with 19 clock inputs. This operation is repeated until the content of the reference counter 12 becomes 100.

Similar principles apply to the frequencies $f_2$ and $f_3$.

According to this invention, the capacity change of the received gasoline can be digitally indicated from the change of the liquid level in the cylindrical gasoline tank of the horizontal type, which brings forth the effect that the quantity of gasoline in the tank, etc. can be grasped numerically.

I claim:

1. An indicator for indicating the quantity of liquid in a tank comprising, a sensor for sensing the level of liquid in the tank and for generating an output signal indicative of the liquid level, a function generator connected to receive the output signal of the sensor and to supply a signal corresponding to a function comprising a straight line segment approximation of the relationship between the quantity of liquid and the liquid level in the tank, said function generator including an analog-to-digital converter which comprises an integrator, a two way switch for connecting the input of the integrator selectively to receive the signal from the sensor and a reference signal, a clock oscillator, a reference counter connected to the clock oscillator to control the switch to select the reference signal when a predetermined count is reached, and a zero detector connected to the output of the integrator to control the switch to select the sensor signal when the integrator output reaches zero, said function generator further comprising a nonlinear digital-to-digital conversion circuit connected to said clock for producing output pulses in response to clock pulses, corresponding to approximate polygonal lines of a curve of a segmental function corresponding to the relationship between the quantity of liquid and the liquid level in a cylindrical gasoline tank having a horizontal axis, a digital counter connected to the output of the nonlinear conversion circuit, and a digital indicator connected to the output of the digital counter to indicate the quantity of the liquid in the tank.

2. An indicator as claimed in claim 1, in which the non-linear digital-to-digital conversion circuit comprises a variable division circuit whose clock input is connected via a one-way switch to the clock oscillator and whose division control input is connected to the reference counter, said one-way switch being closed when the two-way switch selects the reference signal.

3. An indicator as claimed in claim 2, in which the variable division circuit comprises a fixed division resettable counter, and a comparator arranged to comprare the output of the fixed division counter with a divisor selection signal from the counter, the comparator output being connected to the reset input of the fixed division counter and forming the output of the variable division circuit.

* * * * *